United States Patent
Kimura (10) Patent No.: US 9,005,534 B2
(45) Date of Patent: Apr. 14, 2015

(54) FLUE-GAS DESULFURIZATION EQUIPMENT

(71) Applicant: Takeshi Kimura, Mito (JP)

(72) Inventor: Takeshi Kimura, Mito (JP)

(73) Assignees: Takeshi Kimura, Ibaraki (JP); Noriko Kimura, Tokyo (JP); Junko Sato, Ibaraki (JP); Shigeru Kimura, Tokyo (JP)

(*) Notice: Subject to any disclaimer, the term of this patent is extended or adjusted under 35 U.S.C. 154(b) by 358 days.

(21) Appl. No.: 13/661,818

(22) Filed: Oct. 26, 2012

(65) Prior Publication Data
US 2013/0309139 A1  Nov. 21, 2013

(30) Foreign Application Priority Data
May 15, 2012 (JP) ................................. 2012-111978

(51) Int. Cl.
B01D 53/80 (2006.01)
B01D 53/50 (2006.01)

(52) U.S. Cl.
CPC ........ B01D 53/504 (2013.01); *B01D 2251/404* (2013.01)

(58) Field of Classification Search
CPC . B01D 53/80; B01D 53/504; B01D 2251/404
USPC ................ 422/168, 177, 209, 234, 106, 270; 96/286, 291
See application file for complete search history.

(56) References Cited

U.S. PATENT DOCUMENTS 7,527,679 B2 * 5/2009 Kimura ........................... 96/286
2008/0008630 A1 * 1/2008 Kimura ......................... 422/177

* cited by examiner

*Primary Examiner* — Jill Warden
*Assistant Examiner* — Joye L Woodard
(74) *Attorney, Agent, or Firm* — Wenderoth, Lind & Ponack, LLP (57) ABSTRACT

In flue-gas desulfurization equipment, in order to gypsumize sulfur dioxide in a byproduct at approximately 100% and to make desulfurization rate approximately 100%, the flue-gas desulfurization equipment (1) according to the present invention is provided with a basket-shaped rotation cylinder (20) arranged in the fixing duct (10) in a state of being supported rotatably around a horizontal shaft (21), a rotation packed bed (30) formed by filling fillers for gas-liquid contact in the basket-shaped rotation cylinder (20), a slurry storage tank (40) having plural communication storage sections (41) located below the rotation packed bed (30) and divided by separation plates (43) each of which has a communication part (43a), and slurry spraying means (63) which are provided corresponding to the plural communication storage sections (41) and which spray the absorbent slurry extracted from the corresponding communication storage sections (41) to upper parts of the communication storage section (41) in the rotation packed bed (30) respectively.

2 Claims, 3 Drawing Sheets

FLUE-GAS DESULFURIZATION EQUIPMENT

BACKGROUND OF THE INVENTION

The present invention relates to flue-gas desulfurization equipment (hereinafter, FGD equipment) for removing sulfur dioxide from gas exhausted from factories or electrical power plants, especially to a FGD equipment which can reduce slurry circulating volume and draft pressure loss leading to energy consumption, which has approximately 100% of desulfurization rate by assuming a case of installing it as a preceding step of a device for recovering carbon dioxide gas which is installed sometime in the future and which can make byproducts gypsum at approximately 100%.

In the past, the FGD equipment removing sulfur dioxide gas from processed gas by flowing adsorbent slurry down in vertical direction in a cylindrical casing and by flowing the processed gas therein is known.

Especially in Japan, the FGD equipment whose system uses a vertical type of a cylindrical body and makes the processed gas flown vertically is used widely.

However, in the FGD equipment whose system uses the vertical type of the cylindrical body, there is problem such that energy consumption becomes large as slurry circulating volume is increased. Concretely, in the FGD equipment, since gas throughput is increased with the square of a diameter of the cylindrical body, the circulating volume of the slurry being absorbent is increased with the square of the diameter of the cylindrical body.

On the other hand, though an exhaust desulfurizer whose system is to flow the processed gas in horizontal direction by using a horizontally cylindrical body arranged so as for a rotation shaft to extend in horizontal direction is similar to the FGD equipment using the vertically cylindrical body in point that the gas throughput is increased with the square of the diameter of the cylindrical body, the slurry circulating volume is increased only in direct proportion to the diameter of the cylindrical body.

Accordingly, without pausing to image a linear expression graph and a quadratic expression graph, because the slurry circulating volume in the case of using horizontally cylindrical body is less than one in the case of using vertically cylindrical body and the energy consumption is less, so that it is advantageous to use the horizontally cylindrical body. Especially in a large type of the FGD equipment, as a cylindrical body becomes larger, it is remarkably advantageous to use the horizontally cylindrical body rather than to use the vertically cylindrical body.

Besides, the reason that the FGD equipments using the vertically cylindrical body are used widely in Japan is thought to be due to applying attitude of a gas adsorption device developing based on an original small size device to the FGD equipment being a large size device.

For instance, what are shown in Japanese utility model publication No. sho 53-19171 and Japanese patent No. 4418987 (U.S. Pat. No. 7,527,679B2/CN 101099922B) are known as the FGD equipment using the horizontally cylindrical body.

Japanese utility model publication No. sho 53-19171 is that a lot of lifters or troughs consisting of U-shaped tubs for scooping up desulfurizing agent are provided in parallel to axial direction on an inner wall of a rotation cylinder with an annular end plate having a processed gas inlet port at one end thereof and an annular end plate having an outlet port at the other end thereof, and the rotation cylinder in which a lot of separated fillers having apertures or holes are filled in a whole internal space is arranged horizontally and rotatably, and a means for supplying absorption slurry is provided at one end of the rotation cylinder and an outlet of the slurry is discharged at the other end of the rotation cylinder.

In this FGD equipment, while the fillers positioned at a lower part are immersed in the slurry retained below of the rotation cylinder, the rotation cylinder is rotated so as to bring the processed gas into contact with the absorption slurry in countercurrent flow or in parallel flow, so that gas-liquid contact can be achieved.

As an actual achievement of working the FGD equipment described in Japanese utility model publication No. sho 53-19171, there are a prototype machine with 1 m diameter of the rotation cylinder (a rotation packed bed), a first practical machine with 3.2 m diameter of the rotation cylinder, a second practical machine with 4.5 m diameter of the rotation cylinder and a third practical machine with 4.5 m diameter of the rotation cylinder, and all of them are successful, and especially the first and the second practical machine have approximately 40 years operation performance. Here, they have 3 m length in axial direction of the rotation cylinder. Besides, if considering that byproducts are calcium sulfite, the length of the rotation cylinder can be made shorter (approximately by 1 m).

The succession of these machines is to support the above opinion such that "it is remarkably advantageous to use the horizontally cylindrical body rather than to use the vertically cylindrical body in the FGD equipment being a large device".

The operation performance of every machine is shown in Table 1:

TABLE 1

| | Gas Throughput ($Nm^3/h$) | Diameter (m) | Length (m) | Slurry Circulating Volume ($m^3/h$) |
| --- | --- | --- | --- | --- |
| Prototype Machine | 5,000 | 1 | 3 | 150 |
| First Practical Machine | 60,000 | 3.2 | 3 | 480 |
| Second Practical Machine | 90,000 | 4.5 | 3 | 675 |
| Third Practical Machine | 90,000 | 4.5 | 3 | 675 |

As shown in Table 1, the slurry circulating volume is increased only in direct proportion to the diameter of the cylindrical body in each machine, it is understood that "it is remarkably advantageous to use the horizontally cylindrical body rather than to use the vertically cylindrical body in the FGD equipment being a large device".

Thus, in the FGD equipment described in Japanese utility model publication No. sho 53-19171, about the slurry circulating volume, it should be noted that circulating volume of the slurry must be considered in proportion to the diameter of the rotation cylinder.

Furthermore, as shown in Table 1, every machine has 3 m length in the axial direction of the rotation cylinder (the rotation packed bed), and this shows it is advantageous to use the horizontal cylinder rather than to use the vertical cylinder in the case that the diameter of rotation cylinder becomes more than 3 m.

Here, it is another factor that should not be overlooked that the larger the diameter of the rotation cylinder, the larger the dropping height of the slurry in proportion to the diameter of the rotation cylinder. Namely, chemical reaction quantity associated with once dropping of the slurry is 3.2 times in the case of 3.2 m diameter of the rotation cylinder, and 4.5 times in the case of 4.5 m diameter of the rotation cylinder, based on the case of 1 m diameter of the rotation cylinder. Accordingly, in the case of a fourth trial designed machine as will become apparent below, as the diameter of the rotation cylinder is 24.3 m, the chemical reaction quantity associated with once dropping of the slurry becomes 24.3 times.

This may be thought for it to be a root that it is advantageous to flow the gas horizontally rather than to flow the gas vertically.

On the other hand, operation of the FGD equipment described in Japanese utility model publication No. sho 53-19171 is, in an aspect of chemical reaction, to produce gypsum as a byproduct by using limestone slurry as an absorbent for sulfur dioxide. In this case, process such that calcium sulfite is produced as a medium product, and then, the calcium sulfite is oxidized by oxygen in the processed gas (exhaust gas) to be gypsum is carried out.

For the process for gypsumization of the calcium sulfite, it was known that there is delicate relation between oxygen concentration in the processed gas and pH of the gypsum slurry discharged from the device.

Arranging knowledge about the process of gypsumization of the calcium sulfite as mentioned above, it is considered as follows.

$$SO_2 + H_2O \rightarrow H_2SO_3 \tag{1}$$

$$CaCO_3 \rightarrow Ca^{2+} + CO_3^{2-} \tag{2}$$

$$Ca^{2+} + H_2SO_3 \rightarrow CaSO_3 + 2H^+ \text{ (aqueous calcium sulfite)} \tag{3}$$

$$CO_3^{2-} \rightarrow CO_2 + \tfrac{1}{2}O_2 \tag{4}$$

$$CaSO_3 + \tfrac{1}{2}H_2O \rightarrow CaSO_3 \cdot 1/2H_2O \text{ (crystalline calcium sulfite)} \tag{5}$$

$$CaSO_3 + \tfrac{1}{2}O_2 + 2H_2O \rightarrow CaSO_4 \cdot 2H_2O \text{ (gypsum crystal)} \tag{6}$$

In acid slurry in a slurry outlet side (a gas introducing inlet side), crystalline calcium sulfite is dissolved, and reaction shown in the following formula (7) is undergone.

$$CaSO_3 \cdot 1/2H_2O \rightarrow CaSO_3 + \tfrac{1}{2}H_2O \tag{7}$$

Furthermore, reaction shown in the following formula (8) is undergone by reacting with $\tfrac{1}{2}O_2$ in the above formula (4) and $O_2$ of excess air in the processed gas.

$$CaSO_3 + \tfrac{1}{2}O_2 + H_2O \rightarrow CaSO_4 \cdot 2H_2O \tag{8}$$

Besides, a desulfurizer for harmful gas described in Japanese Patent No. 4418987 is provided with installation of a basket-shaped rotation cylinder which is supported rotatably around a horizontal shaft in a fixed duct and inside of which gas-liquid contact fillers is filled, a slurry storage tank located below of the basket-shaped rotation cylinder, and a back-flow means for pumping up absorbent slurry in the slurry storage tank and flowing back it to an outer peripheral surface of the basket-shaped rotation cylinder. In the desulfurizer for harmful gas, since the basket-shaped rotation cylinder can be rotated only by flowing the absorbent slurry back, an electrical driving means for the basket-shaped rotation cylinder can be unneeded, it is possible to minimize the device and to reduce electrical consumption.

Recently, it is said that carbon dioxide gas that causes global heating because of smoke exhausted from factories or power plants must be recovered. And, as a previous step of recovering the carbon dioxide gas from the exhaust smoke, though a FGD equipment for removing sulfur dioxide from the exhaust smoke is used, not only low-cost but also high-performance (approximately 100% desulfurization) is required.

Furthermore, Japanese Patent No. 4505041 by the present inventors is shown as a patent invention in relation with it.

SUMMARY OF THE INVENTION

However, there is a possibility that desulfurization is decreased in the FGD equipment described in Japanese utility model publication No. sho 53-19171.

Namely, in the FGD equipment described in Japanese utility model publication No. sho 53-19171, in the case that amount of oxygen in the processed gas, calcium sulfite can be oxidized by oxygen in the processed gas to produce gypsum. However, in the case that amount of oxygen in the processed gas is little, the equipment has no means for taking oxygen into the equipment, so that gypsumization reaction does not proceed sufficiently. In this case, gypsumization becomes possible if the operation is carried out in an acid condition by decreasing pH of drainage of the equipment, but for it, it is necessary to work by decreasing a feed of limestone slurry from theoretical requirement, and limestone becomes insufficient with the desulfurization decreasing.

On the other hand, in the desulfurization equipment described in Japanese patent No. 4418987, though it is possible to take a means for supplement want of oxygen amount in the processed gas by blowing new air into the circulating slurry, for increasing the effectiveness, it has been necessary to form flow of the absorbent slurry so as to acidize strongly in a slurry outlet side (a gas introducing inlet side) and to basify strongly in a slurry inlet side (a gas outlet side).

Besides, also in the desulfurization equipment described in Japanese patent No. 4418987, desulfurization has a tendency to decrease by want of the limestone slurry.

A problem of the present invention is to make the calcium sulfite to gypsum at approximately 100% and to make the desulfurization approximately 100%.

To resolve the above problem, flue-gas desulfurization (FGD) equipment according to a first invention is characterized by being provided with a fixing duct formed with a specific length having a gas introduction inlet at one side and a gas discharge outlet at another side; a basket-shaped rotation cylinder formed approximately cylindrically whose both end surfaces and a peripheral surface are formed in reticulated or lattice pattern, wherein the end surface at one side faces the gas introduction inlet and the end surface at another side faces the gas discharge outlet, and which is located in the fixing duct in the condition of being supported rotatably around a horizontal shaft; a rotation packed bed which is constituted of filling fillers for gas-liquid contact in the basket-shaped rotation cylinder and through which gas introduced from a gas introduction inlet flows in an axial direction thereof; gas shield plates arranged at a gas introduction inlet side and a gas discharge outlet side of the rotation packed bed; a slurry storage tank located below the rotation packed bed and having plural communication storage sections which are divided by partition plates each of which has a communication part at a portion thereof; a slurry feed means for feeding absorbent slurry to a gas discharge outlet side in the slurry storage tank; a slurry discharge means for discharging the absorbent slurry from a gas introduction side in the slurry storage tank; and slurry spray means which are provided in response to the plural communication storage sections respectively and each of which sprays the absorbent slurry extracted from the corresponding communication storage section to an upper part of the communication storage section of the rotation packed bed, wherein the plural communication storage sections are arranged so as to line up along the axial direction, and wherein the absorbent slurry which is fed to the gas discharge outlet side in the slurry storage tank by the slurry feed means moves through the plural communication storage sections to the gas introduction inlet side with desulfurization and gypsumization and discharges from the gas introduction inlet side in the slurry storage tank.

In the FGD equipment according to the first invention, the plural communication storage sections are provided so as to line up along the axial direction in the slurry storage tank. And, the absorbent slurry fed to the gas discharge outlet side in the slurry storage tank moves through the plural communication storage sections to the gas introduction inlet side with desulfurization and gypsumization and discharges from the gas introduction inlet side in the slurry storage tank.

Thus, as compared to pH values of the absorbent slurry stored in the communication storage sections respectively, the closer the communication storage section of the plural communication storage sections is positioned to the gas discharge outlet side, the stronger basic of the absorbent slurry stored in the corresponding communication storage section is, and the closer the communication storage section of the plural communication storage sections is positioned to the gas introduction inlet side, the stronger acid of the absorbent slurry stored in the corresponding communication storage section is.

Accordingly, as compared to pH values of absorbent slurry spayed to parts of the rotation packed bed respectively, the closer the part in the gas discharge outlet side, the stronger basic of the absorbent slurry spayed to the corresponding part is, and the closer the part is to the gas introduction inlet side, the stronger acid of the absorbent slurry spayed to the corresponding part is.

Thus, because pH value of the absorbent slurry discharged from the gas introduction inlet side is decreased to be able to be acidic, so that gypsumization of calcium sulfite can be carried out more surely. This gypsumization is made surely by air blown into the slurry storage tank, so that acid level of gypsum slurry discharged from the gas introduction inlet side can be decreased.

Accordingly, due to the FGD equipment according to the first invention, calcium sulfite in the byproduct can be gypsumized at approximately 100% and its desulfurization rate can be made at approximately 100%.

Here, the slurry feed means according to the first invention corresponds to a slurry feeder 62 as described below, the slurry discharge means corresponds to a slurry discharge device 64 as described below, and the slurry spray means corresponds to a circulation device 63 as described below.

Flue-gas desulfurization (FDG) equipment according to a second invention is characterized by, in the FDG equipment according to the first invention, providing with an independent storage section divided by a separation plate without the communication part in the slurry storage tank; a liquid level control means for feeding absorbent slurry to the independent storage section so as to hold a specific liquid level thereof; and a slurry spay means for spraying the absorbent slurry extracted from the independent storage section to an upper part of the independent storage section in the rotation packed bed, wherein the independent storage section is positioned at the gas discharge outlet side of the plural communication storage sections, wherein the slurry feed means feeds the absorbent slurry extracted from the independent storage section to the communication storage section of the plural communication storage sections positioned the closest to the gas discharge outlet side, so that feed of the absorbent slurry can be controlled.

In the FDG equipment according to the second invention, the independent storage section without communication to the communication storage sections is provided on the gas discharge outlet side of the plural communication storage section. And, the absorbent slurry is fed to the independent storage section so that the liquid level of the absorbent slurry in the independent storage section.

Thus, the absorbent becomes more excess in the absorbent slurry stored in the independent storage section positioned closer the gas discharge outlet side than the plural communication storage sections. Accordingly, the absorbent slurry with a state of more excess absorbent is sprayed to an upper part (a part closest the gas discharge outlet side) of the independent storage section in the rotation packed bed. Therefore, even if the feed of the absorbent slurry is decreased, it is possible to make the desulfurization approximately 100%.

For instance, when four communication storage sections a~d and one independent storage section e (total five storage sections) are provided in the slurry storage tank, the absorbent slurry stored in the communication storage section a that is positioned the closest the gas introduction inlet side becomes acid~neutrality, the absorbent slurry stored in the communication storage sections b~d that are positioned closer the gas discharge outlet side than the communication storage section a becomes basic, and the absorbent (limestone) is in the most excess in the absorbent slurry stored in the independent storage section e that is positioned the closest the gas discharge outlet side. And, in this state, the absorbent slurry stored in every communication storage section a~e is sprayed and circulated to the upper part of every storage section a~e in the rotation packed bed.

In this case, feed of the absorbent slurry fed to the communication storage section d positioned secondarily from the gas discharge outlet side of the five storage sections a~e is controlled so that gypsum slurry discharged from the gas introduction inlet side becomes acidic (pH 3~6).

Here, if the feed of the absorbent slurry is a theoretical feed 95% calculated from processed gas quantity and concentration of the sulfur dioxide, desulfurization rate of the gas in the part where is from the above of the communication storage section a to the above of the communication storage section d becomes approximately 95% by lack of the absorbent. However, residual 5% of the sulfur dioxide acid gas is desulfurized in the upper part of the independent storage section e in the rotation packed bed by that the independent storage section e where the absorbent slurry with a much excess state of the absorbent is sprayed is arranged at the gas discharge outlet side of the communication storage section d. Thus, in a whole of the rotation packed bed, approximately 100% of the desulfurization rate can be achieved.

Accordingly, due to the FGD equipment according to the second invention, calcium sulfite in the byproduct can be gypsumized at approximately 100% and desulfurization rate thereof can be made approximately 100%.

Due to the FGD equipment according to the present invention, pH value of the absorbent slurry (gypsum slurry) discharged from the gas introduction inlet side is decreased to be able to be acidic, and gypsumization of the calcium sulfite can be performed more surely. Furthermore, the gypsumization function becomes more surely by the air blown into the slurry storage tank, so that acidic level of the gypsum slurry can be decreased.

Besides, due to the FGD equipment according to the present invention, desulfurization rate can be made approximately 100% by a mechanism explained the former paragraphs.

Namely, due to the FGD equipment according to the present invention, it is possible to gypsumize the calcium sulfite in the byproduct at approximately 100% and it is possible to make the desulfurization rate approximately 100%.

DESCRIPTION OF THE PREFERRED EMBODIMENTS

Hereinafter, flue-gas desulfurization equipment 1 according to an embodiment of the invention is explained by referring the drawings.

The flue-gas desulfurization (FGD) equipment 1 is equipment that installed on a flue-gas route of a factory, a power plant or the like and removes sulfur dioxide from discharged flue-gas (processed gas).

Especially, it is very advantageous that the FGD equipment is installed before carbon dioxide gas recovery equipment for recovering carbon dioxide from the flue-gas.

(Constitution of the FGD Equipment)

Figure 1:
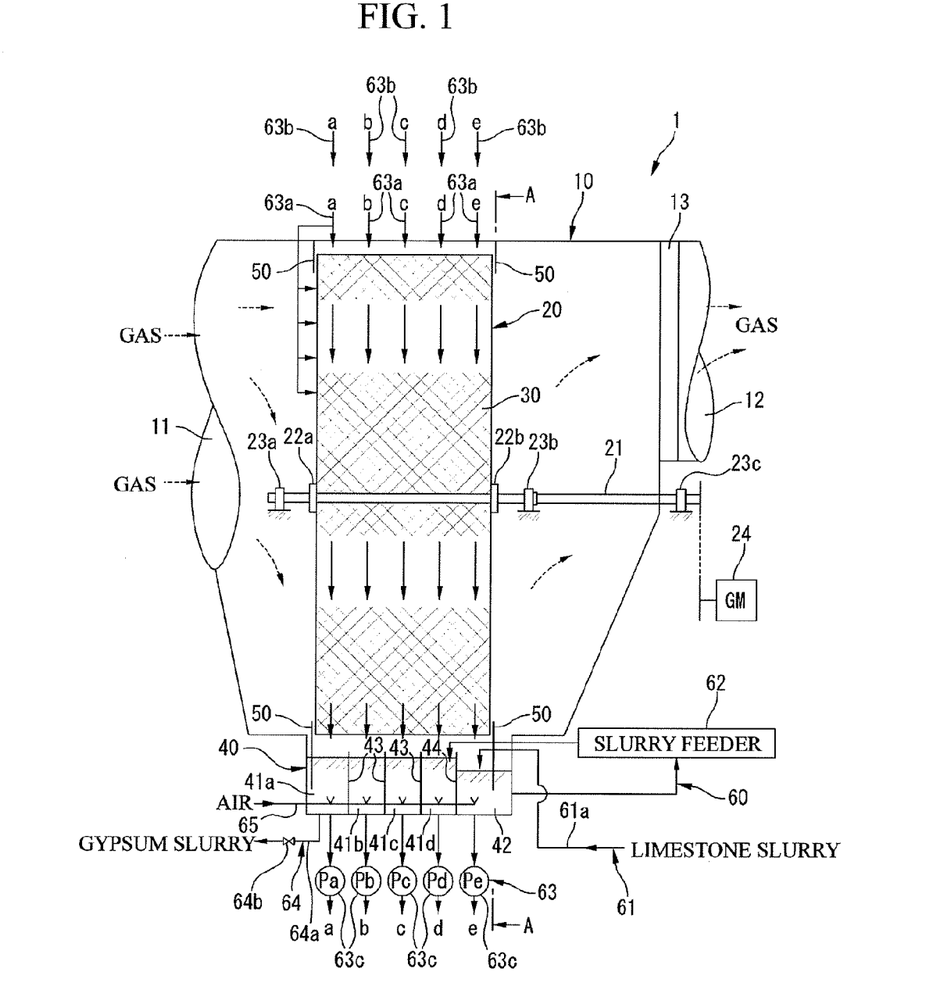
FIG. 1 is a cross-sectional view of the flue-gas desulfurization equipment according to one embodiment of the invention.

FIG. 1 is a cross-sectional view of the FGD equipment according to the embodiment of the present invention. FIG. 1 shows a state cutting the FGD equipment in the vertical direction along a horizontal shaft 21 of a basket-shaped rotation cylinder 20. Besides, in FIG. 1, flow of circulating absorbent slurry is indicated by solid arrows and flow of processed gas is indicated by dashed arrows.

Figure 2:
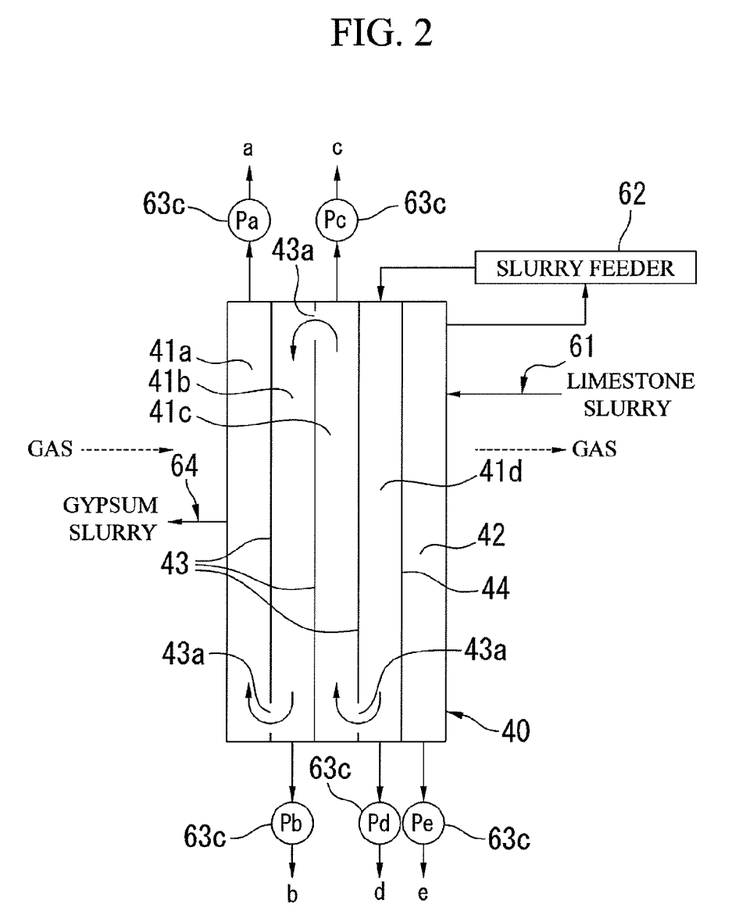
FIG. 2 is a plan view of a slurry storage tank equipped by the flue-gas desulfurization equipment shown in FIG. 1.

FIG. 2 is a plan view of a slurry storage tank 40 equipped by the FGD equipment 1. Especially, FIG. 2 shows arrangement of separation plates 43, 44 in the slurry storage tank 40, the flow of the absorbent slurry is indicated by the solid arrows and the flow of the processed gas is indicated by the dashed arrows.

Figure 3:
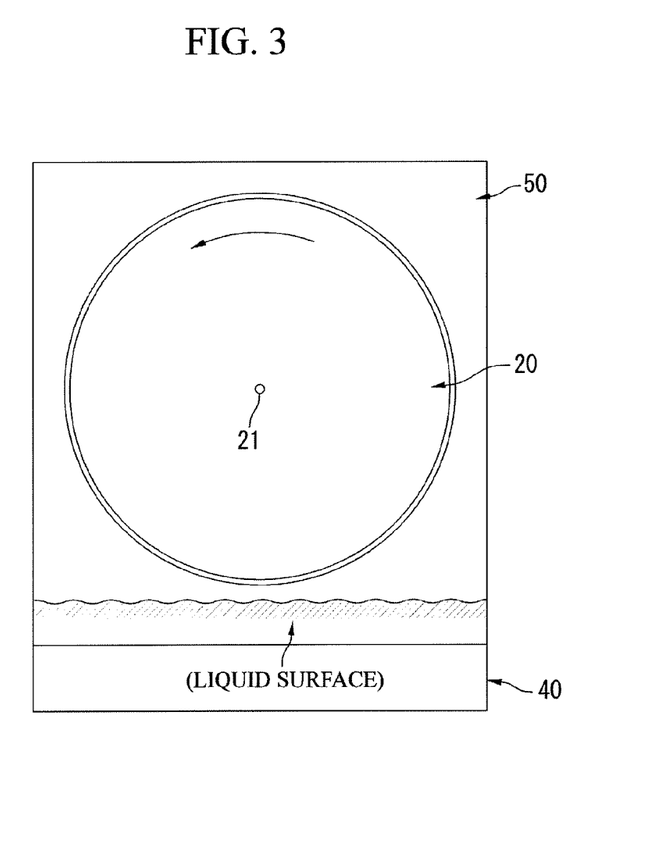
FIG. 3 is a cross-sectional view cut along A-A line shown in FIG. 1.

FIG. 3 is a cross-sectional view along A-A line shown in FIG. 1. FIG. 3 shows a state that one of gas seal plates 50 is seen from a direction along the horizontal shaft 21 of the basket-shaped rotation cylinder 20.

The FGD equipment 1 shown in FIG. 1 is provided with a fixing duct 10, the basket-shaped rotation cylinder 20 arranged in the fixing duct 10, a rotation packed bed 30 formed in the basket-shaped rotation cylinder 20, the slurry storage tank 40 located below the rotation packed bed 30, a pair of the gas seal plates 50, and a slurry circulation system 60 for circulating the absorbent slurry.

The fixing duct 10 is formed with a specific length and arranged along horizontal direction. The fixing duct 10 has an inner space possible to install the basket-shaped rotation cylinder 20 therein by expanding a central part down below and in a front-back direction (depth direction shown in FIG. 1). The fixing duct 10 has a gas introduction inlet 11 provided at one side in processed gas flowing direction (horizontal direction shown in FIG. 1) and a gas discharge outlet 12 provided at another side in the processed gas flowing direction. Besides, a mist separator 13 is provided on the gas discharge outlet 12.

The basket-shaped rotation cylinder 20 is formed in cylindrical basket-shape. Besides, the basket-shaped rotation cylinder 20, especially a whole including the both end surfaces and a peripheral surface is formed in a reticulated or lattice pattern. In this embodiment, the both end surfaces and a peripheral surface are formed in the reticulated or lattice pattern at approximately 60 mm intervals in order to fill fillers for gas-liquid contact with 75 mmø×75 mm mmø. The basket-shaped rotation cylinder 20, whose end surface at one side faces the gas introduction inlet 11 side and whose end surface at another side faces the gas discharge outlet 12 side, is arranged rotatably around the horizontal shaft 21 inserted into a pair of bosses 22a, 22b. One end of the horizontal shaft 21 is located at the gas introduction inlet 11 side and another end of it is located at the gas discharge outlet 12 side, so that the horizontal shaft 21 is supported rotatably by three bearings 23a, 23b and 23c.

Furthermore, the basket-shaped rotation cylinder 20 is rotated and driven around the horizontal shaft 21 by a geared motor 24. Rotation rate of the basket-shaped rotation cylinder 20 is approximately 5 rpm.

Besides, this embodiment is constituted of that the basket-shaped rotation cylinder 20 is rotated by the geared motor 24, but it may be also constitution that the basket-shaped rotation cylinder 20 is rotated by a water wheel principle using weight of the absorbent slurry sprayed above the rotation packed bed 30 instead of the geared motor 24 (seeing Japanese patent publication No. 4418987).

The rotation packed bed 30 is formed by filling many fillers for gas-liquid contact in the basket-shaped rotation cylinder 20. As fillers for gas-liquid contact, what can form many interspaces in the basket-shaped rotation cylinder 20, such as plastic cylindrical members, Raschig rings, pole rings, net rings or the like are used. Thus, the rotation packed bed 30 can make the gas introduced from the gas introduction inlet 11 pass along the axial direction (direction that the horizontal shaft 21 extends).

The slurry storage tank 40 is arranged at a bottom part of the fixing duct 10 and located below the rotation packed bed 30. The slurry storage tank 40 is formed in a box shape whose upper part is opened and so as to be able to storage and circulate the absorbent slurry. Here, in this embodiment, limestone is used as an absorbent and limestone slurry is used as the absorbent slurry.

As shown in FIGS. 1 and 2, plural (four in this embodiment) communication storage sections 41a~41d divided by partition plates 43 each of which has a communication portion 43a in a part thereof and an independent storage section 42 divided by a partition plate without the communication portion are provided in the slurry storage tank 40. The four communication storage sections 41a~41d and the independent storage section 42 are arranged so as to line up along the axial direction (the direction that the horizontal shaft 21 extends). Concretely, the communication storage section 41a is located the closest the gas introduction inlet 11 side, the communication storage sections 41b, 41c and 41d are located in series from the gas introduction inlet 11 side to the gas discharge outlet 12 side, and the independent storage section 42 the closest the gas discharge outlet 12 side. Furthermore, the absorbent slurry can be flown in or out between neighboring communication storage sections 41a~41d via the communication parts 43a of the separation plates 43 respectively. On the other hands, the independent storage section 42 is not communicated with the next communication storage section 41d.

As shown in FIGS. 1 and 3, gas seal plates are arranged on the gas introduction inlet 11 side and the gas discharge outlet 12 side respectively. Each of the gas seal plates 50 is formed in an approximately square plate and a circular through hole is provided in a center portion thereof. Diameter of the through hole of the gas seal plate 50 is smaller than diameter of the basket-shaped rotation cylinder 20 (the rotation packed bed 30). The gas seal plates 50 are arranged in a state that lower end parts thereof are inserted into the liquid of the absorbent slurry stored in the slurry storage tank 40, so that they seal between the basket-shaped rotation cylinder 20 (rotation packed bed 30) and an inner surface of the fixing duct 10, respectively.

The slurry circulation system 60 is provided with a liquid level control device 61, a slurry feeder 62, circulation devices 63, a slurry discharge device 64 and an air blowing device 65.

The liquid level control device 61 is provided with a limestone slurry feed pipe 61a and a slurry feed means (not shown in figures) for feeding the absorbent slurry (limestone slurry) to the independent storage section 42 via the limestone slurry feed pipe 61a. The liquid level control device 61 feeds the absorbent slurry to the independent storage section 42 so as to hold a specific liquid level.

The slurry feeder 62 feeds the absorbent slurry to the gas discharge outlet 12 side in the slurry storage tank 40. Concretely, the slurry feeder 62 feeds the absorbent slurry extracted from the independent storage section 42 to the communication storage section 41d which is positioned the closest the gas discharge outlet 12 side of the plural communication storage sections 41a~41d. At this case, the slurry feeder 62 can control the feed of the absorbent slurry.

The circulation devices 63 have slurry spray devices 63a for spraying the absorbent slurry to the rotation packed bed 30, pipes 63b connecting the slurry spray devices and the slurry storage tank 40, circulation pumps 63c for pumping the absorbent slurry stored in the slurry storage tank 40 to the slurry spray devices 63a via the pipes 63b, respectively.

Here, the slurry spray device 63a may be constitution of spraying the absorbent slurry by a spray nozzle, or may be constitution of flowing down the absorbent slurry from a top end of the pipe, and they are not limited.

In the present embodiment, the circulation devices 63 corresponding to the four communication storage sections 41a~41d and the independent storage section 42 respectively (total five circulation devices 63) are provided. Concretely, in the present embodiment, five slurry spray devices 63a, five pipes 63b and five circulation pumps 63c (Pa, Pb, Pc, Pd, Pe shown in FIG. 1) are provided. Here, in FIG. 1, symbols a~e are marked below the circulation pumps 63c, above the pipes 63b and above the slurry spray devices 63a respectively, but theses indicate that the circulation pumps 63a, pipes 63b and the slurry spray devices 63a that the same symbols a~e are marked are connected. Furthermore, the circulation devices 63 spray the absorbent slurry extracted from the corresponding storage sections 41a~41d and 42 to the upper parts of the corresponding storage sections 41a~41d and 42 in the rotation packed bed 30, respectively.

The slurry discharge device 64 has a gypsum slurry discharge pipe 64a and a valve 64b provided on the gypsum slurry discharge pipe 64a. The slurry discharge device 64 discharges the absorbent slurry (gypsum slurry) from the gas introduction inlet 11 side in the slurry storage tank 40. Concretely, the slurry discharge device 64 discharges the absorbent slurry (gypsum slurry) from the communication storage section 41a the closest the gas introduction inlet 11 side of the plural communication storage sections 41a~41d. In this case, the slurry discharge device 64 can control the liquid level of every communication storage sections 41a~41d by controlling discharge amount of the absorbent slurry.

The air blowing device 65 can blow air into the liquid of the absorbent slurry stored in the four communication storage sections 41a~41d and the independent storage section 42 respectively.

(Control of the FGD Equipment)

Next, control of the FGD equipment is explained.

Feed of the absorbent slurry into the slurry storage tank 40 by the liquid level control device 61 is controlled so that height of liquid surface of the absorbent slurry in the independent storage section 42 positioned at the gas discharge outlet 12 side becomes a specific height.

Feed of the absorbent slurry into the communication storage section 41d by the slurry feeder 62 is controlled so that pH value of the absorbent slurry discharging from the communication storage section 41a positioned at the gas introduction inlet 11 side becomes within 3~6.

In this case, in order to make the absorbent slurry be acidic, amount of the absorbent (limestone) contained in the absorbent slurry becomes insufficient against a theoretical requirement calculated from amount of the processed gas and concentration of sulfur dioxide. Thus, desulfurization rate of the processed gas in a part from the upper part of the communication storage section 41a to the upper part of the communication storage section 41d becomes approximately 95% because of want of the limestone. However, because the independent storage section 42 that stores the absorbent slurry which is in much excess of the absorbent is arranged the closest the gas discharge outlet 12 side of the five storage sections 41a~41d and 42, the absorbent slurry with much excess of the absorbent is sprayed to a part the closest the gas discharge outlet 12 side in the rotation packed bed 30, so that residue 5% of the sulfur dioxide is desulfurized in this part. Thus, approximately 100% of desulfurization rate can be achieved in a whole of the rotation packed bed 30.

Liquid level of the absorbent slurry in the slurry storage tank 40 (the communication storage sections 41a~41d) is controlled by controlling on/off of the valve 64b in the slurry discharge device 64.

(Function of the FGD Equipment)

Next, a function of the FGD equipment is explained.

IN the FGD equipment, the processed gas is blown from the gas introduction inlet 11 into the fixing duct 10 by a blower not shown in figures, passes through the basket-shaped rotation cylinder 20 (the rotation packed bed 30) arranged in the center of the fixing duct 10, and is discharged from the gas discharge outlet 12 after the mist separator 13.

On the other hand, in the slurry storage tank 40, the slurry feeder 62 feeds the absorbent slurry extracted from the independent storage section 42 to the communication storage section 41d positioned the closest the gas discharge outlet 12 side of the plural communication storage sections 41a~41d. And the absorbent slurry fed from the gas discharge outlet 12 side (the communication storage section 41d) in the slurry storage tank 40 moves via the plural communication storage sections 41a~41d to the gas introduction inlet 11 side with desulfurization and the gypsumization, and is discharged from the gas introduction inlet 11 side (the communication storage section 41a) via the plural communication storage sections 41a~41d.

In this case, the absorbent slurry stored in every storage sections 41a~41d and 42 is sprayed in the basket-shaped rotation cylinder 20 by the circulation devices 63 that is provided corresponding to the storage sections 41a~41d and 42.

The absorbent slurry sprayed in the basket-shaped rotation cylinder 20 is flown down on surfaces of the fillers for gas-liquid contact with being influenced by gravity of the absorbent slurry flowing down in the basket-shaped rotation cylinder 20 and rotation of the basket-shaped rotation cylinder 20, and flown down to the every storage sections 41a~41d and 42 of slurry storage tank 40 with reacting by gas-liquid contact with a wider area that slurry liquid film formed in this time comes in contact with the processed gas passing through the fixing duct 10.

Furthermore, the absorbent slurry flown down the slurry storage tank 40 contains a lot of gypsum produced in the reaction by the gas-liquid contact with the reprocessed gas.

Besides, in the slurry storage tank 40, because the air blowing device 65 blows air into the liquid of the absorbent slurry, the absorbent slurry is stirred and fresh oxygen is supplemented to resolve the limestone powder and to circulate the absorbent slurry in turns.

As mentioned above, in the FGD equipment 1, the plural communication storage sections 41a~41d and 42 are provided so as to line up along the axial direction. And, the absorbent slurry fed to the gas discharge outlet 12 side of the slurry storage tank 40 (the independent storage section 42) moves to the gas introduction inlet 11 side via the plural communication storage sections 41a~41d with the desulfurization and the gypsumization, and discharges from the gas introduction inlet 11 side of the slurry storage tank 40 (the communication storage section 41a).

Thus, as compared to pH values of the absorbent slurry stored in the every communication storage sections, the closer the communication storage section is positioned to the gas discharge outlet 12 side in the plural communication storage sections, the stronger basic of the absorbent slurry stored in the communication storage section is, and the closer the communication storage section is positioned to the gas introduction inlet 11 side in the plural communication storage sections, the stronger acidity of the absorbent slurry stored in its communication storage section is.

Accordingly, as compared to pH value of the absorbent slurry sprayed in every part in the rotation packed bed 30, the closer to the gas discharge outlet 12 side, the stronger basic of the absorbent slurry spayed to the part is, and the closer to the gas introduction inlet 11 side, the stronger acidity of the absorbent slurry sprayed to the part is.

Thus, the pH value of the absorbent slurry (gypsum slurry) discharged from the gas introduction inlet 11 side can be decreased to be acidic, and gypsumization of calcium sulfite can be performed more surely. This gypsumization action is made more surely by the air blown into the slurry storage tank 40, so that acidic level of the gypsum slurry discharged from the gas introduction inlet 11 side can be weakened.

Especially, the absorbent slurry stored in the independent storage section 42 positioned closer to the gas discharge outlet 12 side than the plural communication storage section 41a~41d is in a state of much excess of the absorbent. Accordingly, the absorbent slurry with much excess of the absorbent is sprayed an upper part of the independent storage section 42 (a part positioned the closest to the gas discharge outlet 12 side) in the rotation packed bed 30.

Here, if the feed of the absorbent slurry is set to 95% of theoretical feed calculated from amount of the processed gas and concentration of the sulfur dioxide, desulfurization rate of the gas in a part from the upper part of the communication storage section 41a to the upper part of the communication storage section 41d in the rotation packed bed 30 becomes approximately 95% due to want of the absorbent. However, because the independent storage section 42 where the absorbent slurry with much excess of the absorbent is located at the gas discharge outlet 12 side in the communication storage section 41d, residue 5% of the sulfur dioxide is desulfurized in the upper part of the independent storage section 42. Thus, in a whole of the rotation packed bed 30, approximately 100% of the desulfurization rate can be achieved.

Next, a working example of the FGD equipment is explained.

Test models 1~4 of the FGD equipment by limestone-gypsum method with 100% of desulfurization were produced experimentally based on data of the embodiments of the FGD equipment described in the Japanese utility model publication No. sho 53-19171 (the prototype machine with 1 m diameter of the rotation packed bed, the first practical machine with 3.2 m diameter of the rotation packed bed, the second practical machine with 4.5 m diameter of the rotation packed bed, and the third practical machine with 4.5 m diameter of the rotation packed bed).

The result of every test model is shown in Table 2.

TABLE 2

|  | Test Model 1 | Test Model 2 | Test Model 3 | Test Model 4 |
|---|---|---|---|---|
| Gas Throughput (Nm$^3$/h) | 200,000 | 500,000 | 1,000,000 | 3,000,000 |
| ConcenTration of sulfur dioxide in the gas introduction inlet (ppm) | 1,000 | 1,000 | 1,000 | 1,000 |
| Diameter of the basket-shaped rotation cylinder (m) | 6.2 | 9.9 | 14.0 | 24.3 |
| Length of the basket-shaped rotation cylinder (m) | 3 | 3 | 3 | 3 |
| Rotation rate of the basket-shaped rotation cylinder (rpm) | 5 | 5 | 5 | 5 |
| Maximum area of the slurry dropping part (m$^2$) | 6.2 × 3.0 | 9.9 × 3.0 | 14.0 × 3.0 | 24.3 × 3.0 |
| Volume of the circulating pump (m$^3$/h) (Pa + Pb + Pc + Pd + Pe) | 930 | 1495 | 2100 | 3645 |
| Desulfurization rate (%) | 100 | 100 | 100 | 100 |
| Byproduct | gypsum | gypsum | gypsum | gypsum |
| Pump required head (m) | 10 | 15 | 20 | 30 |
| Loss of draft pressure (mm) | less than 200 | less than 200 | less than 200 | less than 200 |
| Slurry amount per unit area | 50 m$^3$/m$^2$h | 50 m$^3$/m$^2$h | 50 m$^3$/m$^2$h | 50 m$^3$/m$^2$h |

In a journal "Thermal and Nuclear Power Generation", No. 2 thermal power plant in Matsuura (J-Power) and No. 1 thermal power plant in Hitachinaka (TEPCO) are introduced as equipment of 3,000,000 Nm$^3$/h class, there is description such that:

in the case of Matsuura thermal power No. 2,

Circulation Pump: 72.5 m$^3$/min×12

Ventilator: 39,200 m$^3$/min×560 mmAq in the case of Hitachinaka No. 1,

Circulation Pump: 127.5 m$^3$/min×5.

Calculating this, amount of slurry circulation is 52,200 m³/h in the former and 38,250 m³/h in the latter.

As compared these figures to the test model 4, the result becomes shown in Table 3.

TABLE 3

| | Amount of slurry circulation | Rate |
|---|---|---|
| J-Power Matsuura | 52,200 | 14.3 |
| TEPCO Hitachinaka | 38,250 | 10.5 |
| Present Invention (Test model 4) | 3,645 | 1 |

As shown in Table 3, there is large difference in the amount of slurry circulation between the case of the present invention and the case of J-power Matsuura or TEPCO Hitachinaka.

The FGD equipment by the limestone-gypsum method used in Japan is a spray tower system mainly, but it is not what prepares a means for ensuring 100% desulfurization, and there is disadvantage that energy consumption is large since the amount of slurry circulation by the circulation pump is extraordinary large as shown in Table 3 and loss of the draft pressure is large.

In contrast, due to the FGD equipment according to the present invention, the amount of the slurry circulation can be decreased and length of the rotation cylinder is short, so that the draft pressure can be decreased and it is possible to control the energy consumption.

What is claimed is:

1. Flue-gas desulfurization equipment characterized by being provided with a fixing duct formed with a specific length having a gas introduction inlet at one side and a gas discharge outlet at another side;

a basket-shaped rotation cylinder formed approximately cylindrically whose both end surfaces and a peripheral surface are formed in reticulated pattern or lattice pattern, wherein said end surface at one side faces the gas introduction inlet and said end surface at another side faces the gas discharge outlet, and which is located in the fixing duct in the condition of being supported rotatably around a horizontal shaft;

a rotation packed bed which is constituted of filling fillers for gas-liquid contact in the basket-shaped rotation cylinder and through which gas introduced from a gas introduction inlet flows in an axial direction thereof;

gas seal plates arranged at a gas introduction inlet side and a gas discharge outlet side of the rotation packed bed;

a slurry storage tank located below the rotation packed bed and having plural communication storage sections which are divided by partition plates each of which has a communication part at a portion thereof;

a slurry feed means for feeding absorbent slurry to a gas discharge outlet side in the slurry storage tank;

a slurry discharge means for discharging the absorbent slurry from a gas introduction side in the slurry storage tank; and slurry spray means which are provided in response to the plural communication storage sections respectively and each of which sprays the absorbent slurry extracted from the corresponding communication storage section to an upper part of the communication storage section of the rotation packed bed, wherein the plural communication storage sections are arranged so as to line up along the axial direction, and wherein the absorbent slurry which is fed to the gas discharge outlet side in the slurry storage tank by the slurry feed means moves through the plural communication storage sections to the gas introduction inlet side with desulfurization and gypsumization and discharges from the gas introduction inlet side in the slurry storage tank.

2. Flue-gas desulfurization equipment according to claim 1, characterized by being provided with an independent storage section divided by a separation plate without the communication part in the slurry storage tank;

a liquid level control means for feeding absorbent slurry to the independent storage section so as to hold a specific liquid level thereof; and a slurry spray means for spraying the absorbent slurry extracted from the independent storage section to an upper part of the independent storage section in the rotation packed bed, wherein the independent storage section is positioned at the gas discharge outlet side of the plural communication storage sections, and wherein the slurry feed means feeds the absorbent slurry extracted from the independent storage section to the communication storage section of the plural communication storage sections positioned the closest to the gas discharge outlet side, so that feed of the absorbent slurry can be controlled.

* * * * *